Patented Nov. 10, 1953

2,658,919

UNITED STATES PATENT OFFICE 2,658,919

PRODUCTION OF KETONES

Louis Schmerling, Riverside, Ill., assignor to Universal Oil Products Company, Chicago, Ill., a corporation of Delaware No Drawing. Application October 16, 1948,
Serial No. 55,013

10 Claims. (Cl. 260—586)

This invention relates to a process for producing ketones and particularly for producing ketones containing at least one alkyl group.

An object of this invention is to convert into a ketone an unsaturated halide of the structure

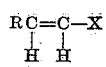

in which R represents a member of the group consisting of alkyl, cycloalkyl, and aryl radicals and X represents a halogen atom.

Another object of this invention is to convert a vinyl halide into a ketone.

In one specific embodiment, this invention relates to a process for producing a ketone which comprises hydrolyzing an unsaturated halide having the structure

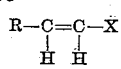

wherein R represents a member of the group consisting of alkyl, cycloalkyl, and aryl radicals, and X represents a halogen atom.

This invention relates to a process for preparing ketones by the hydrolysis of unsaturated halides having the structure

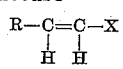

wherein R representes a non-olefinic hydrocarbon radical selected from the group, consisting of alkyl, cycloalkyl, and aryl radicals and X represents a halogen atom, preferably a halogen with an atomic weight of from about 35 to about 80, thus including chlorine and bromine. The formation of ketones from compounds of this structure is unexpected since the expected product is an aldehyde, namely,

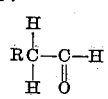

The hydrolysis is carried out by heating the halide with water, particularly in the presence of a weakly basic or acid-acting substance such as sodium bicarbonate, magnesium oxide, magnesium chloride, etc. The following equations illustrate typical reactions which occur in the hydrolysis of the aforementioned unsaturated halides.

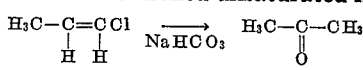

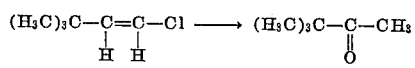

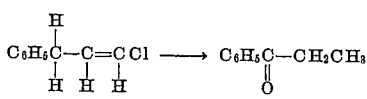

When unsaturated chlorides other than those of the type represented by the above general formulae are treated with water under similar operating conditions, an aldehyde is formed as indicated by the following equation:

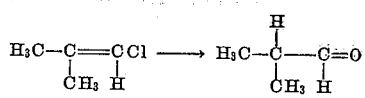

This process is carried out by contacting an unsaturated halide having the structure

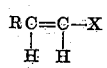

which may be spoken of as a vinyl halide, with water particularly in the presence of a weakly basic or acid-acting substance such as sodium bicarbonate, magnesium oxide, magnesium chloride, and the like at a temperature of from about 150° to about 350° C., preferably from about 225° to 275° C. and at a superatmospheric pressure sufficient to maintain the reaction mixture in substantially liquid phase. This pressure is generally from about atmospheric to a pressure of not more than about 100 atmospheres absolute.

The process may be carried out in batch or continuous types of operation, and preferably by the continuous type of treatment. In continuous hydrolysis of an unsaturated halide of the aforementioned type, a mixture of the halide and an aqueous basic solution is passed continuously through a steel reactor provided with packing material or baffles to effect mixing while said reactor is maintained at a temperature of from about 150° to about 350° C. in order to effect the hydrolysis of the unsaturated halide as the reaction mixture passes through the reaction zone. From the exit end of the reaction zone, the resultant mixture containing basic aqueous solution, ketone formed in the process and unconverted unsaturated halide is subjected to suitable separation and fractionation treatment to recover the ketone and to recycle unconverted halide and at least a portion of the basic aqueous solution to further use in the reaction zone.

The nature of the present invention is illustrated further by the following examples which should not be misconstrued to limit unduly the broad scope of the invention.

Example I

Four parts by weight of 1-chloro-3,3-dimethyl-1-butene and 100 parts by weight of an aqueous solution containing 2% of sodium bicarbonate were reacted at 250° C. for four hours in a rotatable steel autoclave. The resultant reaction mixture was permitted to cool to room temperature and then separated to give a 40% by weight yield of 3,3-dimethyl-2-butanone (pinacolone).

Example II

In a run similar to that described in Example I, 4.5 parts by weight of 1-chloro-3,3-dimethyl-1-butene and 100 parts of water containing 1 part by weight of magnesium oxide were reacted at a temperature of 300° C. for four hours. The resultant reaction mixture gave a 48% yield of pinacolone.

Example III

The reaction of 10 parts by weight of 1-chloro-1-propene with 100 parts by weight of an aqueous solution containing 4% of magnesium chloride at 250° C. during a period of four hours yielded acetone and a higher boiling oil rather than propionaldehyde, the heretofore expected product. Also in a similar run, acetone and unconverted starting materials were obtained when 1-chloro-1-propene and an aqueous solution of sodium bicarbonate were heated at a temperature of 250° C. for five hours.

Example IV

Hydrolysis of 1-chloro-3-phenyl-1-propene by heating 11 parts by weight of this compound at 250° C. for five hours with an aqueous solution containing 10% by weight of sodium bicarbonate yielded propionophenone in 27% by weight yield. In the formation of propiophenone, it will be noted that the point of unsaturation migrated to the carbon atom adjacent to the benzene ring. Similarly, when 1-bromo-2-phenylethylene was heated with water at a temperature of 250° C. for four hours, the product was acetophenone rather than phenylacetaldehyde, the expected product.

Example V

Hydrolysis of 13 parts by weight of 1-chloro-2-cyclopentylethylene by heating at 275° C. for four hours with 110 parts by weight of an aqueous solution containing 8% by weight of sodium bicarbonate yielded 3 parts by weight of methyl-cyclopentyl ketone.

I claim as my invention:

1. A process for producing a ketone which comprises heating at a temperature of from about 150° to about 350° C. a reaction mixture consisting essentially of water, a weakly basic substance and an unsaturated halide having the structure

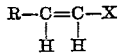

wherein R represents a member of the group consisting of alkyl, cycloalkyl, and aryl radicals, and X represents a halogen atom.

2. A process for producing a ketone containing at least one alkyl group which comprises heating at a temperature of from about 150° to about 350° C. and at a pressure of from substantially atmospheric to about 100 atmospheres a reaction mixture consisting essentially of water, a weakly basic substance and an unsaturated halide having the structure

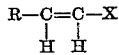

wherein R represents a member of the group consisting of alkyl, cycloalkyl, and aryl radicals, and X represents a halogen atom.

3. A process for producing pinacolone which comprises heating at a temperature of from about 150° to about 350° C. a reaction mixture consisting essentially of water, a weakly basic substance, and 1-chloro-3,3-dimethyl-1-butene.

4. A process for producing propiophenone which comprises heating at a temperature of from about 150° to about 350° C. a reaction mixture consisting essentially of water, sodium bicarbonate, and 1-chloro-3-phenyl-1-propene.

5. A process for producing methyl cyclopentyl ketone which comprises heating at a temperature of from about 150° to about 350° C. a reaction mixture consisting essentially of water, sodium bicarbonate, and 1-chloro-2-cyclopentylethylene.

6. A process for producing a ketone which comprises heating to a temperature of from about 150° to about 350° C. a reaction mixture consisting essentially of water, a hydrolyzing agent selected from the group consisting of weakly basic and weakly acid-acting substances, and an unsaturated halide having the structure

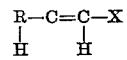

wherein R represents a member of the group consisting of alkyl, cycloalkyl, and aryl radicals and X represents a halogen atom.

7. The process of claim 6 further characterized in that said hydrolyzing agent is a weakly acid-acting substance.

8. The process of claim 6 further characterized in that said temperature is in the range of from about 225° to about 275° C.

9. The process of claim 6 further characterized in that said halogen atom is chlorine.

10. The process of claim 6 further characterized in that said halogen atom is bromine.

LOUIS SCHMERLING.

References Cited in the file of this patent

UNITED STATES PATENTS

| Number | Name | Date |
|---|---|---|
| 2,072,015 | Tamele et al. | Feb. 23, 1937 |
| 2,354,512 | Finch et al. | July 25, 1944 |

FOREIGN PATENTS

| Number | Country | Date |
|---|---|---|
| 424,659 | Great Britain | Feb. 26, 1935 |
| 570,668 | Great Britain | July 17, 1945 |

OTHER REFERENCES

McBee et al.: Ind. Eng. Chem., vol. 33, pages 176–181 (1941).